Figure 1:
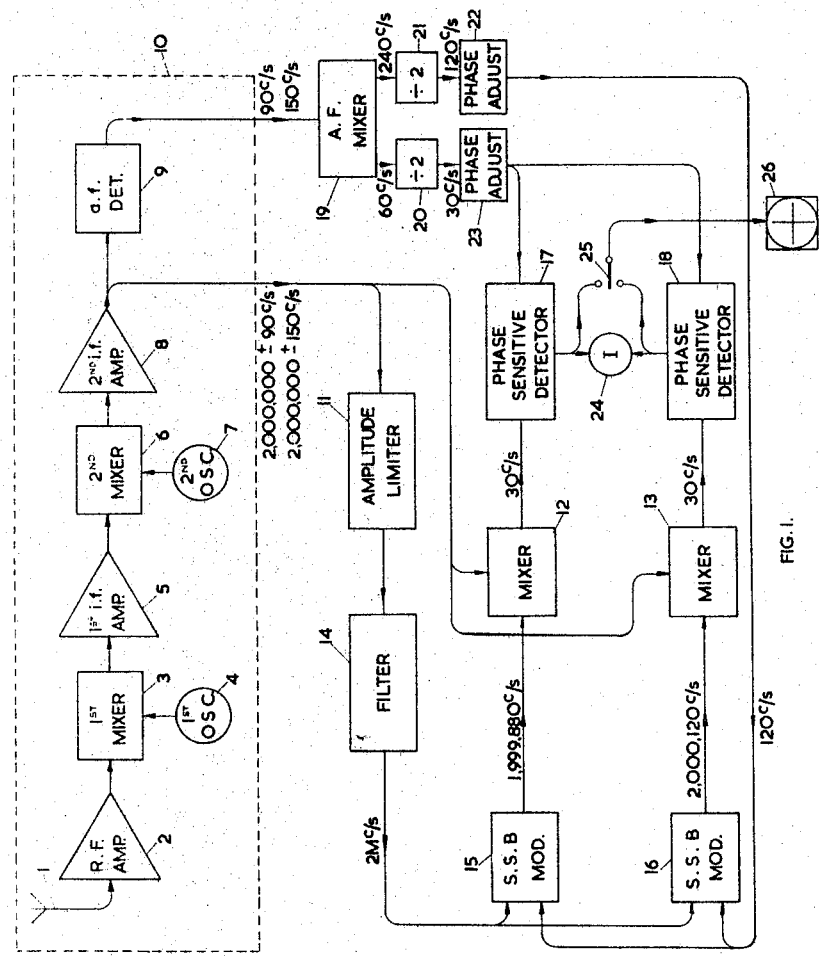

March 7, 1967

J. BENJAMIN 3,308,466

RECEIVERS FOR AN AIRCRAFT LANDING SYSTEM

Filed Sept. 1, 1964

5 Sheets-Sheet 3

Inventor
John Benjamin
By
Cushman, Darby & Cushman
Attorneys

March 7, 1967

J. BENJAMIN 3,308,466

RECEIVERS FOR AN AIRCRAFT LANDING SYSTEM

Filed Sept. 1, 1964

5 Sheets-Sheet 5

Inventor
John Benjamin
By
Cushman, Darby & Cushman
Attorneys

United States Patent Office 3,308,466
Patented Mar. 7, 1967

3,308,466
RECEIVERS FOR AN AIRCRAFT LANDING
SYSTEM
John Benjamin, Farnborough, England, assignor to the Minister of Aviation in Her Majesty's Government of the United Kingdom of Great Britain and Northern Ireland, London, England
Filed Sept. 1, 1964, Ser. No. 393,588
Claims priority, application Great Britain, Sept. 13, 1963, 36,164/63; Sept. 23, 1963, 37,237/63
19 Claims. (Cl. 343—108)

The invention relates to improvements in receivers for a radio approach system for aircraft landing, of the type which yields two double sideband guidance signals the relative amplitudes of which are intended to be a measure of the position of a receiver relative to a preferred approach path. It is applicable to airborne receivers and to ground monitor receivers of the system. One such system is the well-known ILS aircraft landing system, in which the two guidance signals have the same carrier frequency but different modulation frequencies. In the localizer section of an ILS system, a pair of aerials with radiation patterns overlapping in azimuth is commonly used. One aerial radiates a carrier frequency modulated at 90 c./s., and the other radiates the same carrier frequency modulated at 150 c./s. The transmissions from the aerials are arranged so that at all points on the preferred azimuthal approach path signals of equal strength should be received from the two aerials. ILS receivers are arranged to compare the depth of modulation at 90 c./s. with the depth of modulation at 150 c./s. This difference in depths of modulation is assumed to indicate the relative strengths of the signals received from the two aerials and hence the azimuthal approach angle of the aircraft.

If any equipment fault or interference due to atmospheric conditions, reflected radiations, or radiation from other sources, affects the apparent depth of modulation of one signal more than it affects the apparent depth of modulation of the other, a false indication may be given, with dangerous consequences.

Whilst the localizer section of an ILS system defines the approach path in azimuth, the glide path section of the system defines the approach path in elevation. The glide path section of the system works on the same principle as the localizer section, and is subject to the same type of error.

It is an object of the invention to provide an ILS receiver arranged to give warning of interference effects which might be causing incorrect indications. The invention may be applied to the localizer section, or to the glide path section, or both.

According to the invention there is provided a receiver for use in an aircraft landing system of the type which yields two double sideband guidance signals the relative amplitudes of which are intended to be a measure of the position of a receiver relative to a preferred approach path, and including means for obtaining separate measurements of divergence from a preferred approach path from the upper sideband components and from the lower sideband components respectively of two double sideband guidance signals, and means for indicating a discrepancy between the said separate measurements.

According to a feature of the invention in one aspect thereof, there is provided a receiver for use in an aircraft landing system of the type which yields two double sideband guidance signals having different modulations the relative amplitudes of which are intended to be a measure of the position of a receiver relative to a preferred approach path and including: means for extracting a reference carrier frequency from the two guidance signals; means for deriving a first reference audio frequency signal from two modulation frequencies in the guidance signals; two single sideband modulators for providing an upper sideband reference signal and a lower sideband reference signal respectively from a combination of the reference carrier frequency and the first reference audio frequency; a first comparison circuit for mixing one of these reference sideband signals with the two guidance signals to provide signals derived from the two upper modulation sideband components of the two guidance signals and for providing a first difference signal representing the difference between the amplitudes of these two upper sideband components; a second comparison circuit for mixing the other reference sideband signal with the two guidance signals to provide signals derived from the two lower modulation sideband components of the two guidance signals and for providing a second difference signal representing the difference between the amplitudes of these two lower sideband components; and means for indicating a discrepancy between the first difference signal and the second difference signal.

According to a feature of the invention in another aspect thereof, there is provided a receiver for use in an aircraft landing system and including: means for extracting a reference carrier frequency from two guidance signals; a stable local oscillator for generating a local reference frequency; a first combining unit arranged to mix the local reference frequency with the reference carrier frequency; a second combining unit arranged to mix the output of the first combining unit with the two guidance signals; four frequency-sensitive detectors connected to the output of the second combining unit; and differencing means connected to the detectors and arranged to obtain a first difference signal representing the difference in amplitude of the two upper sideband components of the two guidance signals and a second difference signal representing the difference in amplitude of the two lower sideband components of the two guidance signals; and means for indicating a discrepancy between the first and second difference signals.

According to a feature of the invention in yet another aspect thereof, there is provided a receiver for use in an aircraft landing system and including extraction means for obtaining a signal of predetermined carrier frequency modulated by the modulations of two guidance signals; filter means connected to the extraction means and capable of directing the four sideband components of the two guidance signals on to four separate lines; a first comparison circuit connected to two of the lines for providing a first difference signal representing the difference between the amplitudes of the two upper sideband components of the two guidance signals; a second comparison circuit connected to the other two of the lines for providing a second difference signal representing the difference between the amplitudes of the two lower sideband components of the two guidance signals; and means for indicating a discrepancy between the first difference signal and the second difference signal.

Many types of interference will affect the upper sideband components only, or the lower sideband components only, or will affect the upper sideband components more than the lower sideband components or vice-versa. If separate, independent measurements are derived from the upper and the lower sideband components respectively of an ILS signal such interference will be revealed by causing a discrepancy between the two measurements. The present invention is concerned with apparatus for making such measurements and for indicating any important discrepancy between them. Such apparatus may take any one of the alternative forms exemplified by the embodiments to be described hereinafter.

Figure 2:
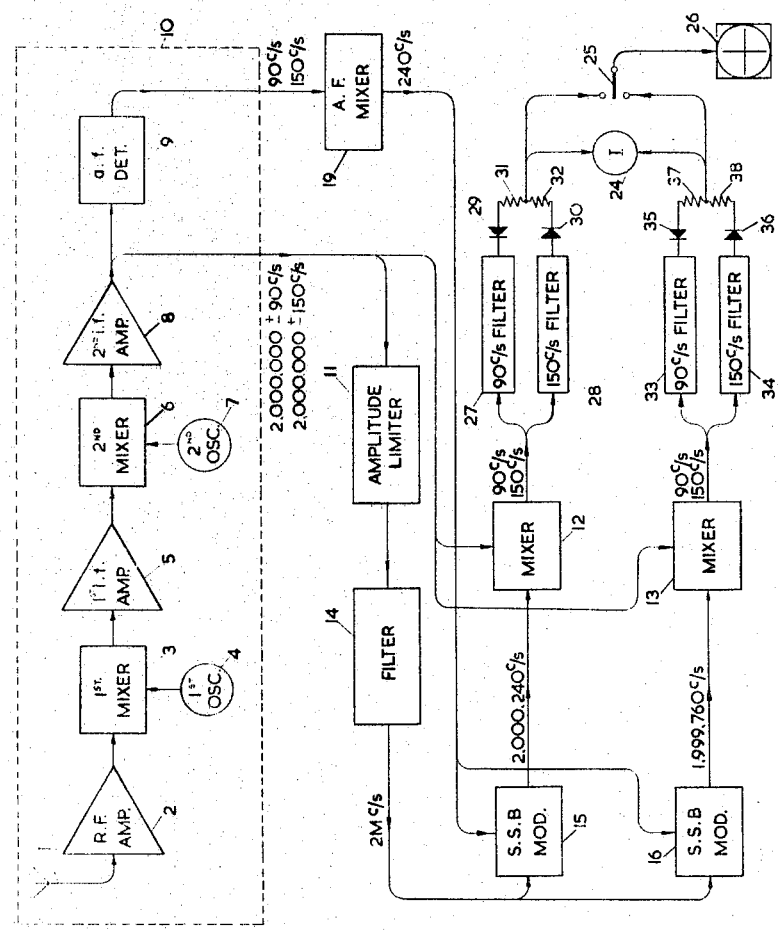
Figure 3:
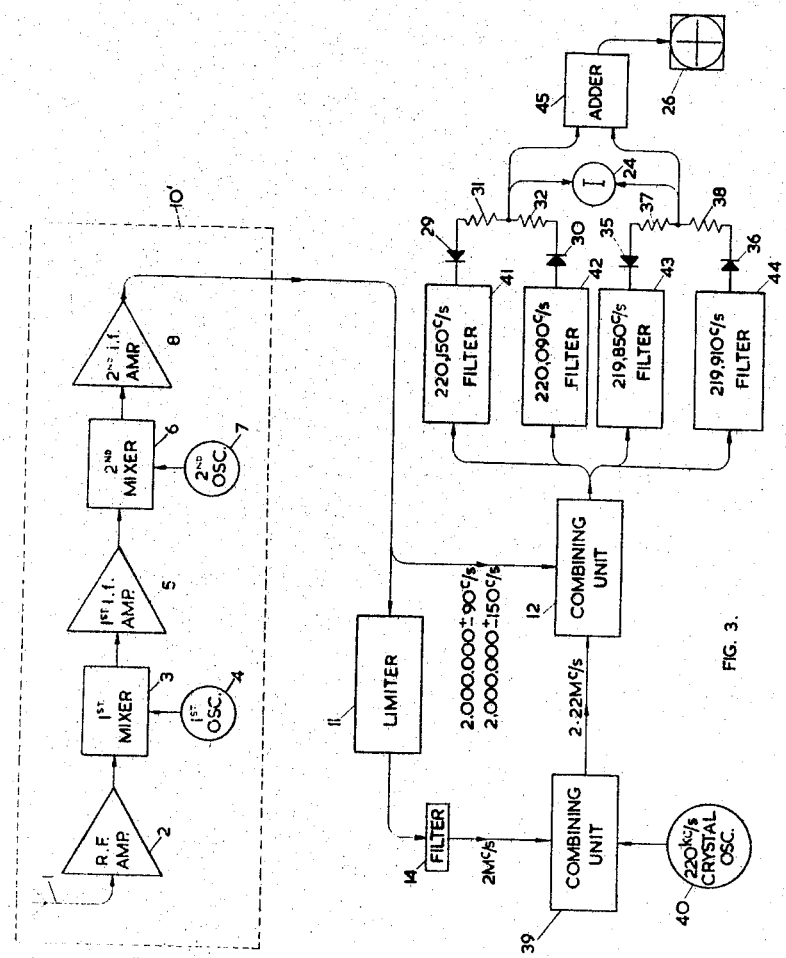
Figure 4:
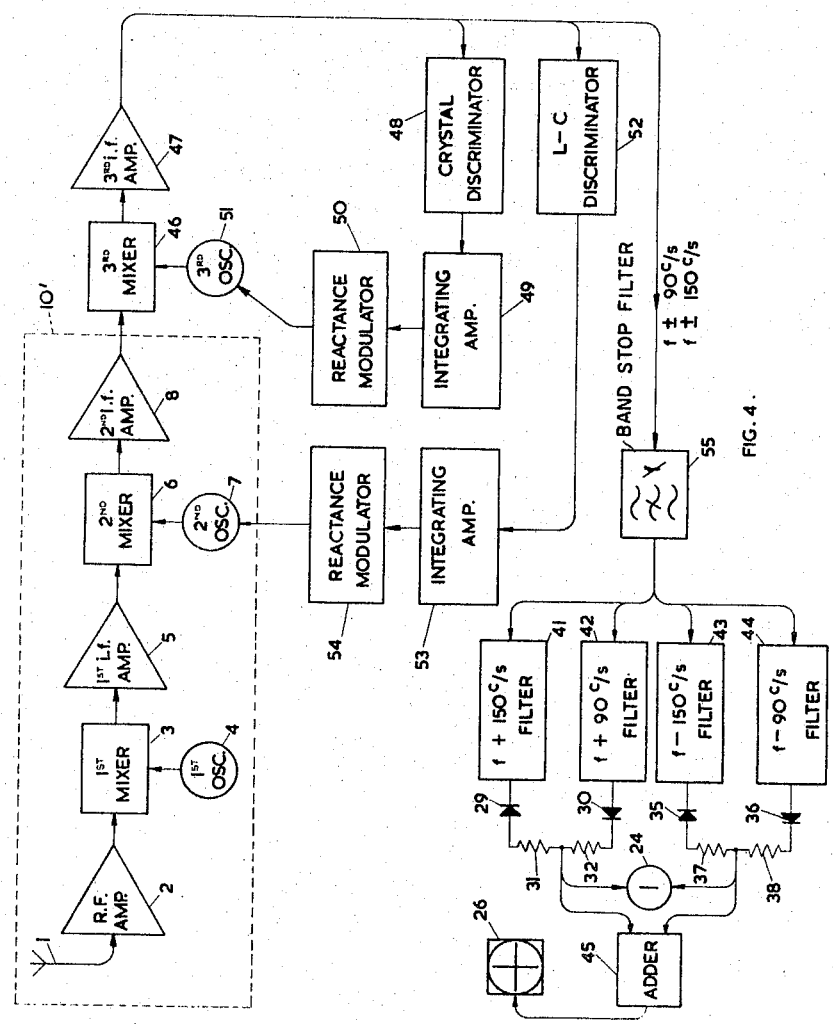
Figure 5:
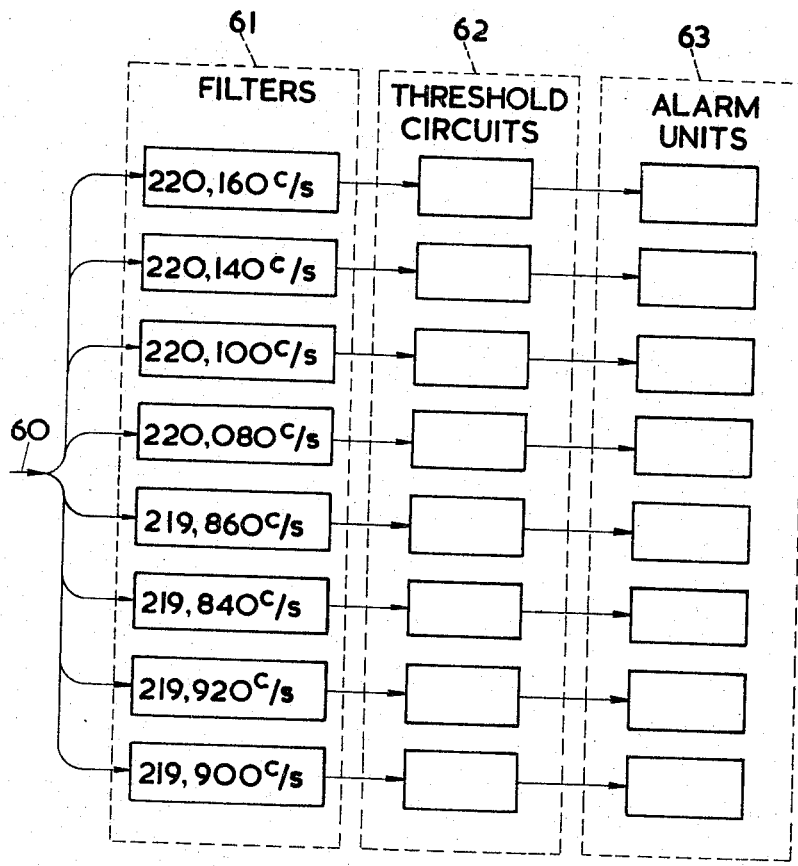

Embodiments of the present invention will now be described, by way of example only, with reference to the following drawings:

FIGURE 1 is a schematic circuit diagram of the localiser section of an ILS receiver, FIGURE 2 is a schematic circuit diagram of the localiser section of a modified version of the ILS receiver of FIGURE 1, FIGURE 3 is a schematic circuit diagram of the localiser section of another ILS receiver, FIGURE 4 filed herewith, which is a schematic circuit diagram of the localiser section of yet another ILS receiver, and FIGURE 5 filed herewith, which is a schematic circuit diagram showing further components which may be added to the receiver of FIGURE 3.

The units 1 to 9 inclusive shown within the broken line 10 of FIGURES 1 and 2 and the display unit 26, constitute the major part of an ILS localiser receiver presently in use. The units 1 to 8 comprise an aerial 1 feeding a double superheterodyne receiver including a radio-frequency amplifier 2, a first mixer 3 and a first local oscillator 4, a first intermediate frequency amplifier 5, a second mixer 6 and a second local oscillator 7, and a second intermediate frequency amplifier 8. The unit 9 is an audio-frequency detector, used in the receivers of FIGURES 1 and 2 only.

FIGURE 1 also shows the output of the second intermediate frequency amplifier 8 applied to an amplitude limiter 11 and to two mixers 12 and 13. The output of the limiter 11 is passed through a filter 14 and thence to a pair of single sideband modulators 15 and 16. The outputs of the s.s.b. modulators 15 and 16 are applied to the mixers 12 and 13 respectively. The outputs of the mixers 12 and 13 are respectively applied to two phase sensitive detectors 17 and 18. The output of the A.F. detector 9, consisting of 90 c./s. and 150 c./s. modulation signals, is applied to an A.F. mixer 19 to produce separate outputs at 60 c./s. and 240 c./s. These outputs are respectively fed to two subharmonic generator units 20 and 21 which divide their input frequencies by two. The 120 c./s. output of subharmonic generator unit 21 is fed through a phase adjuster 22 and thence to the s.s.b. modulators 15 and 16. The 30 c./s. output of subharmonic generator unit 20 is fed through a phase adjuster 23 and thence to the phase sensitive detectors 17 and 18. The outputs of the phase sensitive detectors 17 and 18 are fed to a differential indicator 24 and to the poles of a changeover switch 25. The arm of the changeover switch 25 is connected to the localiser section of an ILS display unit 26.

The operation of this embodiment will now be described. The output of the second I.F. amplifier 8 consists of the second intermediate frequency, which is nominally 2 mc./s., modulated by the 90 c./s. and 150 c./s. component modulations of a received ILS guidance signal. The filter 14 passes the carrier but will not pass the sidebands, thereby providing at its output an unmodulated or reconstituted carrier at 2 mc./s. The output of the A.F. detector 9 consists of the 90 c./s. and 150 c./s. modulations. These modulation signals interact in the mixer 19 to generate sum and difference frequency signals at 240 c./s. and 60 c./s. respectively. From these sum and difference frequencies, the subharmonic generator units 21 and 20 respectively produce signals at 120 c./s. and at 30 c./s., which are used as first and second audio-frequency reference signals. The phase adjusters 22 and 23 are provided so that relative phase shifts in the equipment may be compensated. The 120 c./s. output of subharmonic generator unit 21 may be adjusted by the phase adjuster 22 to vary the sensitivity of the system. The s.s.b. modulators 15 and 16 modulate the 2 mc./s. carrier with the 120 c./s. signal to produce an upper sideband reference signal at 1,999,880 c./s. and a lower sideband reference signal at 2,000,120 c./s. respectively. These signals are mixed in the mixers 12 and 13 respectively with the output of the second I.F. amplifier 8, which contains sideband signals at ±90 c./s. and at ±150 c./s. from the 2 mc./s. carrier frequency. Only 30 c./s. beat frequency signals are passed on from the outputs of the mixers 12 and 13. 30 c./s. beat frequency signals arise in the mixer 12 by the interaction of the 1,999,880 c./s. signal with the lower sideband signals at −90 c./s. and at −150 c./s. from the 2 mc./s. carrier. The −90 c./s. and −150 c./s. modulation components create 30 c./s. signals in antiphase with each other, so that the resultant 30 c./s. output from the mixer 12 indicates the difference in their amplitudes. This action occurs because the 90 c./s. and 150 c./s. modulations of the ILS beacon signal are phase-locked to a common 30 c./s. source, and it may be illustrated mathematically as follows.

The output of the second I.F. amplifier 8 may be expressed generally as $$V8 = A \sin 3\alpha t \sin wt + B \sin 5\alpha t \sin wt \quad (1)$$

or alternatively as $$V8 = \tfrac{1}{2}A \cos (w-3\alpha)t - \tfrac{1}{2}A \cos (w+3\alpha)t \\ + \tfrac{1}{2}B \cos (w-5\alpha)t - \tfrac{1}{2}B \cos (w+5\alpha)t \quad (2)$$

where $w$ is $2\pi$ times the second I.F. frequency, that is $w = 4\pi \times 10^6$, and $\alpha = 60\pi = 2\pi$ times 30 c./s. From the Equation 1 it may be deduced that the outputs of the frequency dividers 20 and 21 should ideally vary as $$V20 = \tfrac{1}{2}AB \cos \alpha t \quad (3)$$

and $$V21 = \tfrac{1}{2}AB \cos 4\alpha t \quad (4)$$

respectively. The output of the filter 14 will be $$V14 = \sin wt \quad (5)$$

and hence the outputs of the s.s.b. modulators 15 and 16 will be proportional to $$V15 = -\tfrac{1}{4}AB \sin (w-4\alpha)t \quad (6)$$

and $$V16 = -\tfrac{1}{4}AB \sin (w+4\alpha)t \quad (7)$$

respectively.

The terms of frequency $\alpha/2\pi$, that is 30 c./s., in the output of the mixer 12 are $\tfrac{1}{8}A^2B \sin \alpha t$ arising from the interaction of V15 with the sideband component represented by the first term on the right-hand side of Equation 2, and $-\tfrac{1}{8}AB^2 \sin \alpha t$ arising from the interaction of V15 with the sideband component represented by the third term on the right-hand side of Equation 2. Hence the signals applied to the phase sensitive detector 17 are ideally $$V23 = k \sin \alpha t \quad (8)$$

where $k$ is a constant greater than $\tfrac{1}{2}AB$, and $$V12 = \tfrac{1}{8}AB(A-B) \sin \alpha t \quad (9)$$

Similarly, the output V16 (Equation 7) from the s.s.b. modulator 16 interacts with the sideband components represented by the second and the fourth terms on the right-hand side of Equation 2 to produce an output from the mixer 13 of the form $$V13 = \tfrac{1}{8}AB(A-B) \sin \alpha t \quad (10)$$

Thus the +90 c./s. and +150 c./s. components interact with the 2,000,120 c./s. signal in the mixer 13 to produce 30 c./s. signals in antiphase with each other, so that the output of the mixer 13 indicates the difference in their amplitudes.

The 30 c./s. signal from the subharmonic generator unit 20 is adjusted by the phase adjuster 23 to be in phase with (or, alternatively, in antiphase with) the outputs from the mixers 12 and 13. The output of the phase sensitive detector 17 varies above or below a datum level according to whether the output of the mixer 12 is in phase with or in antiphase with the signal from the phase adjuster 23; and the deviation of the output from the datum level is proportional to the amplitude of the input from the mixer 12. Similarly the output of the phase sensitive detector 18 varies above or below a datum level according to whether the output of the mixer 13 is in phase with or in antiphase with the signal from the phase adjuster 23; and the deviation of this output from the datum level is proportional to the amplitude of the signal from the mixer 13. Each of the outputs from the detectors 17 and 18 therefore indicates the relative amplitude of the 90 c./s. and 150 c./s. modulations on the ILS signal. Either of these outputs may therefore be selected, by the switch 25, and used to control an ILS indicator 26 of the standard type. The output from the detector 17 is derived from the lower sidebands, and the output from the detector 18 from the upper sidebands of the ILS signal. Any discrepancy between these outputs will be shown by the differential indicator 24, indicating an error, fault or interference in the ILS system.

A modification of the embodiment shown in FIGURE 1 is shown in FIGURE 2, in which components similar to those shown in FIGURE 1 carry the same reference numerals as those shown in FIGURE 1. The parts 1 to 10 inclusive of FIGURE 2 have already been described above in conjunction with FIGURE 1. The output of the second I.F. amplifier 8 is applied to an amplitude limiter 11 and to two mixers 12 and 13, as previously described with reference to FIGURE 1. The output of the limiter 11 is passed through a filter 14 and thence to a pair of single sideband modulators 15 and 16. The outputs of the s.s.b. modulators 15 and 16 are applied to the mixers 12 and 13 respectively. The output of the audio-frequency detector 9 is applied to an A.F. mixer 19 as previously described with reference to FIGURE 1. The output of the A.F. mixer 19 is applied to the s.s.b. modulators 15 and 16.

The output of the mixer 12 is applied to a pair of filters 27 and 28 whose outputs are respectively passed through a pair of rectifiers 29 and 30 and thence through a pair of resistors 31 and 32 to a common point, which is connected to one side of a differential indicator 24 and to one pole of a changeover switch 25. Similarly, the output of the mixer 13 is applied to a pair of filters 33 and 34, whose outputs are respectively passed through a pair of rectifiers 35 and 36 and thence through a pair of resistors 37 and 38 to a common point, which is connected to the other side of the differential indicator 24 and to the other pole of the changeover switch 25. The filters 27 and 33 are designed to pass signals at 90 c./s. but not to pass signals at 150 c./s. The filters 28 and 34 are designed to pass signals at 150 c./s. but not to pass signals at 90 c./s. The arm of the changeover switch 25 is connected to the localizer section of an ILS display unit 26.

The operation of this embodiment will now be described. The components 11 to 16 inclusive and 19 operate as hereinbefore described with reference to FIGURE 1, except that the A.F. mixer 19 supplies signals at 240 c./s. only, and these are applied directly to the s.s.b. modulators 15 and 16 in place of the 120 c./s. signals used in the embodiment of FIGURE 1. The s.s.b. modulators 15 and 16 modulate the 2 mc./s. reconstituted pure carrier frequency with the 240 c./s. signal from the A.F. mixer 19, so as to produce upper and lower sideband reference signals at 2,000,240 c./s. and at 1,999,760 c./s. respectively. These signals are mixed in the mixers 12 and 13 respectively with the output of the second I.F. amplifier 8, which contains sideband component signals at ±90 c./s. and at ±150 c./s. from the 2 mc./s. carrier frequency. Only 90 c./s. and 150 c./s. beat frequency signals are passed on from the outputs of the mixers 12 and 13.

Such signals arise in the mixer 12 by the interaction of the 2,000,240 c.s. upper sideband reference signal with the upper sideband component signals at +90 c./s. and at +150 c./s. from the carrier frequency. The amplitude of the 90 c./s. signal in the mixer output indicates the amplitude of the +150 c./s. sideband component signal in the mixer input. The amplitude of the 150 c./s. signal in the mixer output indicates the amplitude of the +90 c./s. sideband component signal in the mixer input. The output of the mixer 12 is applied to a pair of frequency sensitive detectors, which in FIGURE 2 take the form of a pair of filter units 27 and 28 followed by rectifiers 29 and 30 and resistors 31 and 32. These units separately produce D.C. potentials indicating the amplitudes of the 90 c./s. signal and of the 150 c./s. signal respectively. The resistors 31 and 32 act as a potential divider, so that the potential of their common point indicates the relative amplitudes of the 90 c./s. and 150 c./s. signals from the output of the mixer 12. This potential may be used to operate the ILS display unit 26 via the switch 25.

In the output of the mixer 13, signals at 90 c./s. and at 150 c./s. arise due to the interaction of the 1,999,760 c./s. lower sideband reference signal with the lower sideband component signals at −150 c./s. and at −90 c./s. respectively from the 2 mc./s. carrier. These are measured by a system which is a duplicate of the system described in the preceding paragraph, so that the potential of the common point of the resistors 37 and 38 indicates the relative amplitudes of the 90 c./s. and 150 c./s. signals from the output of the mixer 13. This potential may also be used to operate the ILS display unit 26 via the switch 25. Any discrepancy between the potential at this point and the potential of the common point of the resistors 27 and 28 will be shown by the differential indicator 24, thereby revealing an error, fault, or interference in the ILS system.

In practice, the 2 mc./s. second I.F. and associated frequencies of signals in the ILS receivers of FIGURE 1 and FIGURE 2 may be displaced slightly by Doppler shifts, which in most cases will be much less than 90 c./s. and will, therefore, be negligible. Alternatively the Doppler shifts may be compensated by the action of an automatic frequency control loop at the first I.F. stage.

In FIGURE 3, the units 1 to 8 inclusive shown within the broken line 10′ and the display unit 26, may be identical to the similarly-referenced units of the receivers of FIGURES 1 and 2 and form the major part of an ILS localizer receiver presently in use. The units 1 to 8 comprise an aerial 1 feeding a double superheterodyne receiver including an R.F. amplifier 2, a first mixer 3 and a first local oscillator 4, a first I.F. amplifier 5, a second mixer 6, a second local oscillator 7 and a second I.F. amplifier 8.

The output of the second I.F. amplifier 8 is passed through a limiter 11 and a filter 14 to a first combining unit 39. The filter 14 may form a part of the first combining unit 39. The output of a crystal oscillator 40 is also applied to the first combining unit 39. The output of the first combining unit 39 and the output of the second I.F. amplifier 8 are applied to a second combining unit 12. Four crystal filters 41, 42, 43 and 44 are connected to the output of the second combining unit 12. The outputs of the filters 41 and 42 are passed through a pair of rectifiers 29 and 30 and through a pair of resistors 31 and 32 to a common point, which is connected to one side of a differential indicator 24 and to one input of an adder 45. Similarly, the outputs of the filters 43 and 44 are passed through a pair of rectifiers 35 and 36 and a pair of resistors 37 and 38 to a common point which is connected to the other side of the differential indicator 24 and to another input of the adder 45. The output of the adder 45 is applied to the localizer section of an ILS display unit 26.

This embodiment operates as follows: The output of the second I.F. amplifier 8 consists of the second intermediate frequency, which is nominally 2 mc./s., modulated by the 90 c./s. and 150 c./s. sine wave modulations of a received ILS guidance signal. The amplitude limiter 11 and the filter 14 have the effect of removing the 90 c./s. and 150 c./s. modulations to produce an output at 2 mc./s. This is mixed in the first combining unit 39 with the local reference frequency from the crystal oscillator 40 to produce an output at 2.220 mc./s. with no 90 c./s. or 150 c./s. modulation. This is mixed in the second combining unit 12 with the received ILS guidance signal from the second I.F. amplifier 8. The combining units 12 and 39 may be mixer circuits of known type.

The output of the second combining unit 12 comprises signals of the difference frequencies 220,150 c./s., 220,090 c./s., 219,850 c./s. and 219,910 c./s. The first two of these arise from the upper sideband components of the received ILS guidance signal, and pass through the filters 41 and 42 respectively. The difference frequency signals at 219,850 c./s. and 219,910 c./s. arise from the lower sideband components of the received ILS guidance signal, and pass through the filters 43 and 44 respectively. The filters 41 to 44 inclusive will each pass one and only one of these signals. The filters 41 to 44 therefore separate the four signals so that their amplitudes may be separately measured and compared. The potential at the junction of the resistors 31 and 32 is a measure of the difference in the amplitudes of the upper sideband signals and may be used to control the localizer section of the ILS display unit 26. Similarly, the potential at the junction of the resistors 37 and 38 is a measure of the difference in the amplitudes of the lower sideband signals and may be used to control the localizer section of the ILS display unit 26. FIGURE 3, however, shows these potentials applied to an adder 45, so that their sum is actually used to control the display unit 26. A discrepancy between the upper and the lower sideband signals will actuate the indicator 24.

In the localiser section of the ILS receiver shown in FIGURE 4, the components 1 to 8 inclusive are similar to those hereinbefore described with reference to FIGURE 1. The output of the second I.F. amplifier 8 is connected to a third mixer 46. The output of the third mixer 46 is connected via a third I.F. amplifier 47 to the inputs of a crystal discriminator 48, an L.-C. discriminator 52 and a band-stop filter 55. The outputs of the discriminators 48 and 52 are connected through integrating amplifiers 49 and 53 respectively to reactance modulators 50 and 54 respectively. The output of the reactance modulator 54 is connected to the second local oscillator 7. The output of the reactance modulator 50 is connected to a third local oscillator 51 whose output is connected to the third mixer 46. The output of the band-stop filter 55 is connected to the inputs of four band-pass filters 41, 42, 43 and 44. The outputs of the band-pass filters 41 and 42 are connected to a first comparison circuit comprising rectifiers 29 and 30 and resistances 31 and 32. The outputs of the band-pass filters 43 and 44 are connected to a second comparison circuit comprising rectifiers 35 and 36 and resistances 37 and 38. The outputs of the first comparison circuit and the second comparison circuit are connected to an adder 45 and to the inputs of a differential indicator 24. The output of the adder 45 is connected to the localiser section of an ILS display unit 26. The components 24, 26, 29 to 32 inclusive, 35 to 38 inclusive and 41 to 45 inclusive may be similar to the similarly-referenced components of the receiver of FIGURE 3.

The operation of the localiser section of the receiver shown in FIGURE 4 will now be described. The components 52, 53, 54 and 7 form part of an automatic frequency-control loop which approximately compensates for the frequency variations which normally occur on an incoming ILS signal. The components 48, 49, 50 and 51 form part of a second automatic frequency-control loop which more precisely compensates for residual frequency variations not eliminated by the first frequency-control loop. Thus the output from the third I.F. amplifier consists of a signal of constant carrier frequency $f$ bearing the 90 c./s. and 150 c./s. modulations of the incoming ILS signal. The carrier frequency $f$ may be 220 kc./s. The band-stop filter 55 obstructs the carrier frequency signals while permitting the sidebands of frequencies $f \pm 90$ c./s. and $f \pm 150$ c./s. to pass on to the filters 41 to 44 inclusive. The upper sideband components of the ILS signal, of frequencies $f+150$ c./s. and $f+90$ c./s. respectively, pass through the filters 41 and 42 respectively to the first comparison circuit. The lower sideband components of the ILS signal, of frequencies $f+150$ c./s. and $f+90$ c./s. respectively, pass through the filters 43 and 44 respectively to the second comparison circuit. The function of the comparison circuits is to derive an output signal indicating the difference in the modulation depths of the two modulations (90 c./s. and 150 c./s.) on the incoming ILS signal. The comparison circuits operate similarly to the similarly-referenced components of FIGURE 3 as hereinbefore described with reference to the receiver of FIGURE 3. The output signal of the first comparison circuit is solely dependent on the upper sideband components of the ILS signal. The output signal of the second comparison circuit is solely dependent on the lower sideband components of the ILS signal. Any serious discrepancy between the outputs of the first comparison circuit and the second comparison circuit will be shown by the differential indicator 24. The outputs of the comparison circuits are combined by the adder 45 so that the localiser section of the display unit 26 is in effect operated by the sum of the output signals from the two comparison circuits.

The crystal discriminator 48 may be a discriminator circuit of known form including crystal elements, which responds precisely to frequency variations over a limited range of frequencies. The L.-C. discriminator 52 may be a discriminator circuit of known form including lumped capacitances and inductances, which responds less precisely to frequency variations over a wider range of frequencies than the range in which the crystal discriminator 48 operates correctly. The integrating amplifiers 49 and 53 may be direct current amplifiers having two feedback paths in parallel, of which one feedback path is capacitive and the other feedback path is resistive.

A modification applicable to the receiver of FIGURE 3 when it is used as a monitor on the ground consists of the addition of the components shown in FIGURE 5 which may be connected to the output of the combining unit 12 of FIGURE 3.

FIGURE 5 shows an input line 60 connected to the inputs of a set 61 of bandpass filters, which have very narrow pass-bands. The outputs of the filters of the set 61 are respectively connected to separate threshold circuits of a set 62 of threshold circuits. The outputs of the threshold circuits of the set 62 are respectively connected to separate alarm units of a set 63 of alarm units. The additional components of FIGURE 5 may be fitted to ground monitor receivers to provide additional indications of the nature of any serious interference or other defects affecting the frequency or frequencies of any of the ILS signal components. The frequencies of the filters of the set 61 are chosen so that signals of a frequency which is only slightly above or slightly below the nominal frequency of a component of the ILS signal will pass through one of the filters of the set 61. The thresholds of the threshold circuits of the set 62 are chosen so that any signal passing through a filter of the set 61 and having an amplitude large enough to cause a serious error in the indication of an ILS receiver or to indicate a malfunction of the ILS transmitting apparatus, will operate one of the threshold circuits of the set 62 and thereby actuate one of the alarm units of the set 63.

It should be clearly understood that the above embodiments have been described by way of example only, as many variations and modifications thereof will now be obvious to persons skilled in the art. For instance, the carrier or intermediate frequencies used may have numerical values differing from the values given, if corresponding alterations are made to the filters. Additional components similar to those of FIGURE 5 may be connected to the outputs of the mixers 12 and 13 in the receiver of FIGURE 2. In this case suitable values for the frequencies of the filters of the set corresponding to the set 61 are 100 c./s., 80 c./s., 160 c./s., 140 c./s., 100 c./s., 80 c./s., 160 c./s., and 140 c./s. In any arrangement of additional components similar to FIGURE 5, a greater multiplicity of filters may be used, and at least some of the filters may have frequencies closer to the frequencies of the ILS signal components than the frequencies indicated in FIGURE 5 or listed hereinabove. Some of the alarm units of the set 63 may be connected to more than one of the threshold circuits 62.

Whereas all the above-described embodiments have been described with reference to the localiser section of the ILS aircraft landing system, similar arrangements may readily be applied to the glide path section of the ILS aircraft landing system.

I claim:

1. A receiver for use in an aircraft landing system of the type which yields two double sideband guidance signals the relative amplitudes of which are intended to be a measure of the position of a receiver relative to a preferred approach path, and comprising:
 a superheterodyne radio receiver for receiving an ILS guidance signal;
 resolving means connected to the superheterodyne radio receiver for deriving two upper sideband signals of amplitudes respectively related to the amplitudes of the two upper sideband components of two double sideband guidance signals and for deriving two lower sideband signals of amplitudes respectively related to the amplitudes of the two lower sideband components of the two double sideband guidance signals;
 first measuring means connected to the resolving means for deriving from the said two upper sideband signals a first difference signal indicating the difference in the amplitudes of the said two upper sideband components of the two double sideband guidance signals;
 second measuring means connected to the resolving means for deriving from the said two lower sideband signals a second difference signal indicating the difference in the amplitudes of the said two lower sideband components of the two double sideband guidance signals; and
 indicating means connected to the first measuring means and to the second measuring means, for indicating a discrepancy between the first difference signal and the second difference signal.

2. A receiver according to claim 1 and wherein the resolving means comprises:
 extraction means connected to the superheterodyne radio receiver, for extracting a reference carrier frequency signal from the two double sideband guidance signals;
 first reference means connected to the superheterodyne radio receiver, for deriving a first reference audio frequency signal from two modulation frequencies in the two double sideband guidance signals;
 two single sideband modulators connected to the extraction means and to the first reference means, for providing an upper sideband reference signal and a lower sideband reference signal respectively by modulating the said reference carrier frequency signal by the said first reference audio frequency signal;
 a first mixer connected to one of the single sideband modulators and to the superheterodyne radio receiver for mixing the said upper sideband reference signal and the said two double sideband guidance signals and thereby obtaining the said two upper sideband signals;
 a second mixer connected to the other of the two single sideband modulators and to the superheterodyne radio receiver for mixing the said lower sideband reference signal and the said two double sideband guidance signals and thereby obtaining the said two lower sideband signals.

3. A receiver according to claim 2 and wherein the said two upper sideband signals have the same frequency as each other and occur in antiphase relationship to each other, wherein the said two lower sideband signals have the same frequency as each other and occur in antiphase relationship to each other, wherein there is also provided a second reference means connected to the superheterodyne radio receiver for deriving a second reference audio frequency signal from two modulation frequencies in the two double sideband guidance signals, wherein the first measuring means comprises a first phase sensitive detector connected to the first mixer and to the second reference means, and wherein the second measuring means comprises a second phase sensitive detector connected to the second mixer and to the second reference means.

4. A receiver according to claim 3 and wherein the extraction means comprises an amplitude limiter and a filter connected in series.

5. A receiver according to claim 3 and wherein there is also provided a plurality of band-pass filters connected to the output of the first mixer and a plurality of band-pass filters connected to the output of the second mixer, for passing signals of frequencies close to, but differing from, the frequencies of the said upper sideband signals and the frequencies of the said lower sideband signals; a plurality of threshold circuits each connected to the output of a separate one of the band-pass filters; and alarm units connected to outputs of the threshold circuits.

6. A receiver according to claim 2 and wherein the said two upper sideband signals have differing frequencies; wherein the said two lower sideband signals have differing frequencies; wherein the said two lower sideband signals have differing frequencies; wherein the first measuring means comprises a first filter means connected to the output of the first mixer, for passing a first one of the said two upper sideband signals and for obstructing the other of the said two upper sideband signals; a second filter means connected to the output of the first mixer, for obstructing the said first one of the said two upper sideband signals and for passing the other of the said two upper sideband signals; and a first rectifying and differencing means connected to the outputs of the first and second filter means, for rectifying the outputs of the first filter means and of the second filter means and for obtaining a first difference signal related to the difference between the amplitude of the output of the first filter means and the amplitude of the output of the second filter means; and wherein the second measuring means comprises a third filter means connected to the output of the second mixer, for passing a first one of the said two lower sideband signals and for obstructing the other of the said two lower sideband signals; a fourth filter means connected to the output of the second mixer, for obstructing the said first one of the two lower sideband signals and for passing the other of the said two lower sideband signals; and a second rectifying and differencing means connected to the outputs of the third and the fourth filter means, for rectifying the outputs of the third filter means and of the fourth filter means and for obtaining a second difference signal related to the difference between the amplitude of the output of the third filter means and the amplitude of the output of the fourth filter means.

7. A receiver according to claim 6 and wherein the extraction means comprises an amplitude limiter and a filter connected in series.

8. A receiver according to claim 6 and wherein is also provided a plurality of band-pass filters connected to the output of the first mixer and a plurality of band-pass filters connected to the output of the second mixer, for passing signals of frequencies close to, but differing from, the frequencies of the said upper signals and the frequencies of the said lower sideband signals; a plurality of threshold circuits each connected to the output of a separate one of the band-pass filters; and alarm units connected to outputs of the threshold circuits.

9. A receiver according to claim 2 and wherein the extraction means comprises an amplitude limiter and a filter connected in series.

10. A receiver according to claim 1 and wherein the resolving means comprises:
- extraction means connected to the superheterodyne radio receiver, for extracting a reference carrier frequency signal from the two double sideband guidance signals;
- a stable local oscillator for generating a local reference-frequency signal;
- a first combining means connected to the extraction means and to the stable local oscillator, for mixing the local reference frequency signal with the reference carrier frequency signals; and
- a second combining means connected to the first combining means and to the superheterodyne radio receiver, for mixing the output of the first combining means with the two double sideband guidance signals and thereby obtaining the said two upper sideband signals and the said two lower sideband signals.

11. A receiver according to claim 10 and wherein the first measuring means comprises:
- a first filter means connected to the output of the second combining means, for passing a first one of the said two upper sideband signals and for obstructing the other of the said two upper sideband signals and both of the said two lower sideband signals;
- a second filter means connected to the output of the second combining means, for obstructing the said two lower sideband signals and the said first one of the two upper sideband signals and for passing the other of the said two upper sideband signals; and
- a first rectifying and differencing means connected to the outputs of the first and the second filter means, for rectifying the outputs of the first filter means and the second filter means and for obtaining a first difference signal related to the difference between the amplitude of the output of the first filter means and the amplitude of the output of the second filter means;

and wherein the second measuring means comprises
- a third filter means connected to the output of the second combining unit, for passing a first one of the said two lower sideband signals and for obstructing the other of the said two lower sideband signals and both of the said two upper sideband signals;
- a fourth filter means connected to the output of the second combining unit for obstructing the said two upper sideband signals and the said first one of the two lower sideband signals and for passing the other of the two lower sideband signals; and
- a second rectifying and differencing means connected to the outputs of the third and the fourth filter means, for rectifying the outputs of the third and the fourth filter means and for obtaining a second difference signal related to the difference between the amplitude of the output of the third filter means and the amplitude of the output of the fourth filter means.

12. A receiver according to claim 11 and wherein the extraction means comprises an amplitude limiter and a filter connected in series.

13. A receiver according to claim 11 and wherein there is also provided a plurality of band-pass filters connected to the output of the second combining means, for passing signals of frequencies close to, but differing from, the frequencies of the said upper sideband signals and the frequencies of the said lower sideband signals; a like plurality of threshold circuits each connected to the output of a separate one of the band-pass filters; and alarm units connected to outputs of the threshold circuits.

14. A receiver according to claim 10 and wherein the extraction means comprises an amplitude limiter and a filter connected in series.

15. A receiver according to claim 10 and wherein there is also provided a plurality of band-pass filters connected to the ouput of the second combining means, for passing signals of frequencies close to, but differing from, the frequencies of the said upper sideband signals and the frequencies of the said lower sideband signals; a like plurality of threshold circuits each connected to the output of a separate one of the band-pass filters; and alarm units connected to outputs of the threshold circuits.

16. A receiver according to claim 1 and wherein the resolving means comprises:
- automatic frequency control means connected to the superheterodyne radio receiver for compensating Doppler shifts of the frequency of the two double sideband guidance signals so that the output of the superheterodyne radio receiver comprises a predetermined carrier frequency and sideband signals thereof which constitute the said upper sideband signals and the said lower sideband signals, and
- a band-stop filter means connected in series with the output of the superheterodyne radio receiver, for obstructing the predetermined carrier frequency and for passing the said upper sideband signals and the said lower sideband signals.

17. A receiver according to claim 16 and wherein the first measuring means comprises:
- a first filter means connected to the output of the band-stop filter means, for passing a first one of the said two upper sideband signals and for obstructing the other of the said two upper sideband signals and both of the said two lower sideband signals;
- a second filter means connected to the output of the band-stop filter means, for obstructing the said two lower sideband signals and the said first one of the said two upper sideband signals and for passing the other of the said two upper sideband signals; and
- a first rectifying and differencing means connected to the outputs of the first and the second filter means for rectifying the outputs of the first filter means and of the second filter means and for obtaining a first difference signal related to the difference between the amplitude of the output of the first filter means and the amplitude of the output of the second filter means;

and wherein the second measuring means comprises
- a third filter means connected to the output of the band-stop filter means, for passing a first one of the said two lower sideband signals and for obstructing the other of the said two lower sideband signals and both of the said two upper sideband signals;
- a fourth filter connected to the output of the band-stop filter means, for obstructing the said two upper sideband signals and the said first one of the two lower sideband signals and for passing the other of the said two lower sideband signals; and
- a second rectifying and differencing means connected to the outputs of the third and the fourth filter means, for rectifying the outputs of the third filter means and of the fourth filter means and for obtaining a second difference signal related to the difference between the amplitude of the output of the third filter means and the amplitude of the output of the fourth filter means.

18. A receiver for use in an aircraft landing system of the type which yields two double sideband guidance signals having different modulations the relative amplitudes of which are intended to be a measure of the position of a receiver relative to a preferred approach path, and comprising:

a superheterodyne radio receiver for receiving two double sideband guidance signals;

extraction means connected to the superheterodyne radio receiver, for extracting a reference carrier frequency signal from the received double sideband guidance signals;

first reference means connected to the superheterodyne radio receiver, for deriving a first reference audio frequency signal from the two modulation frequencies in the received double side band guidance signals;

two single sideband modulators connected to the extraction means and to the first reference means, for providing an upper sideband reference signal and a lower reference signal respectively by modulating the said reference carrier frequency signal by the said first reference audio frequency signal;

a first mixer connected to one of the single sideband modulators and to the superheterodyne radio receiver for mixing the said upper sideband reference signal and the received double sideband guidance signals so that the interaction of the said upper sideband reference signal and the two upper sideband components of the received double sideband guidance signals provides signals in antiphase relationship to each other and having the same frequency as each other and whose amplitudes are respectively related to the amplitudes of the two upper sideband components of the received double sideband guidance signals;

a second mixer connected to the other of the two single sideband modulators and to the superheterodyne radio receiver for mixing the said lower sideband reference signal and the received double sideband guidance signals so that the interaction of the said lower sideband reference signal and the two lower sideband components of the received double sideband guidance signals provides signals in antiphase relationship to each other and having the same frequency as each other and whose amplitudes are respectively related to the amplitudes of the two lower sideband components of the received double sideband guidance signals;

a second reference means connected to the superheterodyne radio receiver, for deriving a second reference audio frequency signal from the two modulation frequencies in the received double sideband guidance signals;

a first phase sensitive detector connected to the first mixer and to the second reference means, for providing a first difference signal indicating the difference between the amplitudes of the two upper sideband components of the received double sideband guidance signals;

a second phase sensitive detector connected to the second mixer and to the second reference means, for providing a second difference signal indicating the difference between the amplitudes of the two lower sideband components of the received double sideband guidance signals; and indicating means connected to the first phase sensitive detector and to the second phase sensitive detector, for indicating a discrepancy between the first difference signal and the second difference signal.

19. A receiver for use in an aircraft landing system of the type which yields two double sideband guidance signals having different modulations the relative amplitudes of which are intended to be a measure of the position of a receiver relative to a preferred approach path and comprising:

a superheterodyne radio receiver for receiving two double sideband guidance signals;

extraction means connected to the superheterodyne radio receiver, for extracting a reference carrier frequency signal from the received double sideband guidance signals;

first reference means connected to the superheterodyne radio receiver, for deriving a first reference audio frequency signal from the two modulation frequencies in the received double sideband guidance signals;

two single sideband modulators connected to the extraction means and to the first reference means, for providing an upper sideband reference signal and a lower sideband reference signal respectively by modulating the said reference carrier frequency signal by the said first reference audio frequency signal;

a first mixer connected to one of the single sideband modulators and to the superheterodyne radio receiver for mixing the said upper sideband reference signal and the received double sideband guidance signals so that the interaction of the said upper sideband reference signal and the two upper sideband components of the received double sideband guidance signals provides two upper sideband signals of different frequencies and whose amplitudes are respectively related to the amplitudes of the two upper sideband components of the received double side-band guidance signals;

a second mixer connected to the other of the single sideband modulators and to the superheterodyne radio receiver for mixing the said lower sideband reference signal and the received double sideband guidance signals so that the interaction of the said lower sideband reference signal and the two lower sideband components of the received double sideband guidance signals provides two lower sideband signals of different frequencies and whose amplitudes are respectively related to the amplitudes of the two lower sideband components of the received double sideband guidance signals;

a first filter means connected to the output of the first mixer, for passing a first one of the two upper sideband signals and for obstructing the other of the said upper two sideband signals;

a second filter means connected to the output of the first mixer, for obstructing the said first one of the two upper sideband signals and for passing the other of the said two upper sideband signals;

a first rectifying and differencing means connected to the outputs of the first and the second filter means for rectifying the outputs of the first filter means and of the second filter means and for obtaining a first difference signal related to the difference between the amplitude of the output of the first filter means and the amplitude of the output of the second filter means;

a third filter means connected to the output of the second mixer, for passing a first one of the said two lower sideband signals and for obstructing the other of the said two lower sideband signals;

a fourth filter means connected to the output of the second mixer, for obstructing the said first one of the two lower sideband signals and for passing the other of the said two lower sideband signals;

a second rectifying and differencing means connected to the outputs of the third and the fourth filter means for rectifying the outputs of the third filter means and of the fourth filter means and for obtaining a second difference signal related to the difference between the amplitude of the output of the third filter means and the amplitude of the output of the fourth filter means; and indicating means connected to the first and the second rectifying and differencing means, for indicating a discrepancy between the first difference signal and the second difference signal.

References Cited by the Examiner

UNITED STATES PATENTS

| | | | |
|---|---|---|---|
| 1,935,776 | 11/1933 | Hammond | 325—65 |
| 2,501,668 | 3/1950 | Ferrill | 343—109 |
| 3,013,151 | 12/1961 | Adams et al. | 328—147 X |
| 3,084,329 | 4/1963 | Clay | 325—476 X |

RODNEY D. BENNETT, *Acting Primary Examiner.*

CHESTER L. JUSTUS, *Examiner.*

H. C. WAMSLEY, *Assistant Examiner.*